US006278740B1

(12) United States Patent
Nordyke

(10) Patent No.: US 6,278,740 B1
(45) Date of Patent: Aug. 21, 2001

(54) MULTI-BIT (2I+2)-WIRE DIFFERENTIAL CODING OF DIGITAL SIGNALS USING DIFFERENTIAL COMPARATORS AND MAJORITY LOGIC

(75) Inventor: Keith D. Nordyke, Monterey, CA (US)

(73) Assignee: Gates Technology, Salinas, CA (US)

( * ) Notice: Subject to any disclaimer, the term of this patent is extended or adjusted under 35 U.S.C. 154(b) by 0 days.

(21) Appl. No.: 09/197,324

(22) Filed: Nov. 19, 1998

(51) Int. Cl.[7] ............................ H04B 3/00; H04L 25/00
(52) U.S. Cl. .................. 375/257; 375/292; 341/55; 327/63
(58) Field of Search ........................ 375/286, 288, 375/292, 257, 240, 241; 341/9, 50, 55, 58, 68, 69, 76; 327/50, 63, 64, 65

(56) References Cited

U.S. PATENT DOCUMENTS

| 3,895,223 | 7/1975 | Neuner et al. ................ 235/153 |
| 4,577,332 | 3/1986 | Brenig .......................... 375/17 |
| 4,656,371 | 4/1987 | Binet et al. ..................... 307/362 |
| 4,893,123 | 1/1990 | Boisson ......................... 341/143 |
| 4,910,750 | * 3/1990 | Fisher ............................. 375/292 |
| 4,942,591 | 7/1990 | Nease et al. .................... 375/84 |
| 5,067,111 | 11/1991 | Asano et al. ................. 365/189.08 |
| 5,228,059 | 7/1993 | Takegahara et al. ............ 375/17 |
| 5,355,391 | 10/1994 | Horowitz et al. ............... 375/36 |
| 5,446,786 | 8/1995 | Shtulman ....................... 379/377 |
| 5,621,340 | 4/1997 | Lee et al. ....................... 327/65 |
| 5,740,201 | * 4/1998 | Hui ................................ 375/286 |
| 6,005,895 | * 12/1999 | Perino et al. ................... 375/288 |
| 6,154,498 | * 11/2000 | Dabral et al. .................. 375/257 |

\* cited by examiner

Primary Examiner—Chi Pham
Assistant Examiner—Phuong Phu
(74) Attorney, Agent, or Firm—Stuart T. Auvinen

(57) ABSTRACT

Differential signaling between integrated circuit chips uses fewer than 2 external wires per bit transmitted. Rather than pairing wires into groups of two, the external wires are part of a larger group of 2i+2 wires. Half of the wires in the group are driven low while the other half of the wires are driven high. Since the wires are not paired, adjacent wires can have the same logical state. Differential comparators in the receiver chip compare each wire with all other wires in the group. All outputs of comparators that have a wire as one of its two inputs are input to a majority logic block that evaluates the logical state of the wire. Since half of the wires are in one state, the majority of the remaining wires are in the opposite state of the wire being evaluated. Thus the majority of the comparator outputs indicate the opposite state of the wire being evaluated. Each of the external wires is evaluated by differential comparators and majority logic to get the logical states of each of the external wires. Codes having equal numbers of high and low wires are used to encode binary data over the external wires. Eight external wires can encode a 6-bit binary value, which is 1.5 wires per bit using the (2i+2)-wire codes.

20 Claims, 8 Drawing Sheets

MULTI-BIT (2I+2)-WIRE DIFFERENTIAL CODING OF DIGITAL SIGNALS USING DIFFERENTIAL COMPARATORS AND MAJORITY LOGIC

FIELD OF THE INVENTION

This invention relates to integrated-circuit signaling, and more particularly to encoding of differential signals.

BACKGROUND OF THE INVENTION

A wide variety of digital systems communicate using signal wires. Integrated circuits or chips contain output buffers or drivers that drive an external wire such as a metal trace on a printed-circuit board or a cable connecting networked computers. Two basic techniques are used to pass digital information over external wires: single-wire and two-wire (differential) transmission.

The most common method is to simply transmit the signal over a single external wire. FIG. 1A highlights single-wire transmission. Chip 10 sends a signal to chip 12 over single external wire 18. Output driver 14 in chip 10 receives an internal signal from within chip 10 and drives a much higher current out to external wire 18. An input buffer or receiver 16 in chip 12 is connected to external wire 18. Receiver 16 determines the logical value of the signal on external wire 18 and amplifies and buffers the received signal to internal circuitry within chip 12.

FIG. 1B shows that the signal on the single wire is compared with a logic threshold. Input buffer receivers are designed to have a voltage midpoint or threshold $V_T$ that the input signal is compared with. The "comparison" with the threshold $V_T$ may be implicit in the design and technology of the input buffer rather than an explicit comparison of two voltages. Thus when the received signal is above $V_T$ a logical high is sensed, while a logical low is sensed when the received signal is below $V_T$.

The actual voltage threshold can vary with the technology (process), power-supply voltage, and even the temperature. The ground levels of the two chips can differ. Noise can be coupled into the external wire or to the input buffer through power or ground supplies, or even from other internal circuitry. The noise can raise or lower the threshold significantly. When noise is sufficiently large or the threshold variation is extreme, the wrong logical value of the signal on the external wire can be detected. System failures can result.

The signal transmitted over the single wire may change rapidly. In higher-speed systems it may be desired to sense the signal before the transmitter has finished driving the external wire fully to the intended logic levels. Transmission through noisy environments may also be necessary.

Differential or two-wire transmission is a more robust signaling technique. FIG. 2A shows a differential signal passed between two chips. Rather than use a single wire for each signal, two wires 30, 32 together carry a single logical signal. The wires carry complementary signals: when wire 30 is driven low by driver 22, wire 32 is driven high by driver 24. When driver 22 drives wire 30 high, driver 24 drives wire 32 low. At steady-state after drivers 22, 24 have had enough time to charge or discharge capacitances on wires 30, 32, the logical states of the two wires 30, 32 are opposite.

Inverter 25 inverts an internal signal in chip 10 so that drivers 22, 24 always drive opposite signals to wires 30, 32. Receiver 26 in chip 12 receives both wires 30, 32, and compares their voltages. When the voltage on wire 30 is higher than the voltage on wire 32, a logical high is detected and output to internal circuitry in chip 12. Otherwise, a logical low is detected.

FIG. 2B shows waveforms of a differential pair of wires. Wire 30 has waveform 30', while wire 32 has waveform 32'. When 30' is higher in voltage than 32', such as at the beginning and end of FIG. 2B, a logical high is sensed. When 32' is higher than 30', such as in the middle, a logical low is detected.

Since the two wires 30, 32 are usually in close proximity to one another, and of the same length, any noise injected into one wire is also injected into the other wire. Thus external noise tends to cancel out. Noise from within chip 12, such as ground or power level variations, affects both wires 30, 32 equally. The relative voltages of the two wires, or voltage difference, is not affected by such common-mode noise. Enormous amounts of common-mode noise can be tolerated by differential signaling. There is no fixed threshold voltage that each of the two wires is compared to, as was true for single-wire sensing. Thus threshold variations are not problematic.

The transmitter chip 10 can have a different ground potential than receiver chip 12, since the ground shift affects both wires 30, 32 equally. Very small voltage differences between the two wires 30, 32 can be detected and amplified using current technology. Sensing is faster since smaller voltage swings can be used. Sometimes the voltage swings of the output drivers is purposely limited or clamped so that external capacitances are not full charged. This reduced power consumption and limits noise generated by the two wires. Radiation causing electromagnetic interference (EMI) is also reduced when voltage swings are limited.

FIG. 3 illustrates a prior-art signaling technique using differential-pairs or wires. Chip 10 transmits a multi-signal bus to chip 12 using differential pairs of wires 30, 32. One bit of the bus is transmitted over every two external wires 30, 32. Differential comparators 26 in chip 26 each receive a pair of input wires 30, 32, compare the two inputs, and generate a single bit that is output to internal bus 34.

The 6 bits of internal bus 34 require 12 external wires. Each bit of internal bus 12 was transmitted as a true and a complement signal over a pair of external wires. In general, differential transmission of an N-bit bus requires 2N external wires.

While such differential signaling techniques are more noise tolerant than single-wire signaling, costs are higher. The number of external wires is doubled. Bonding pads for external wires occupy a large area on many integrated circuit chips, increasing cost. Leads on the IC packages are also limited. Increasing the number of external wires connected to a chip, or its lead count, is expensive since larger packages may be required.

What is desired is a differential signaling technique that uses fewer wires. It is desired to reduce the number of external wires needed when transmitting digital signals. It is desired to use differential-comparator receivers that are insensitive to common-mode noise. Differential sensing is desired for noise immunity, while differential transmission is desired so that voltage swings and noise generation can be limited. A compressed differential-signaling technique is desired that uses fewer wires. It is desired to use fewer than 2N external wires while still benefiting from differential sensing.

SUMMARY OF THE INVENTION

A group-differential receiver has a plurality of inputs from X external wires. The X external wires are for transmitting N bits of information, where X is less than 2N but greater than N.

A plurality of differential comparators are for comparing each of the X external wires to a remaining X−1 other wires in the X external wires. Each differential comparator generates a compare output for a pair of wires. A plurality of X majority blocks each receives X−1 compare outputs from a group of X−1 differential comparators. Each differential comparator in the group has a target wire of the X external wires as a comparator input and one of a remaining X−1 other wires as another comparator input.

Each majority block outputs a target state of the target wire as a logic state of a majority of the X−1 compare outputs received by the majority block. A decoder receives X target states from the plurality of X majority blocks, and converts the X target states to the N bits of information. Thus the N bits of information are extracted by differential-comparison and majority-detection of the X external wires.

In further aspects of the invention an inverter is coupled to the compare output from a differential comparator. It inverts the compare output being input to a majority block when the target wire is applied to an inverting input of the differential comparator. Thus compare outputs are inverted when the target wire is applied to the inverting input of the differential comparator.

In still further aspects of the invention the decoder converts the X target states to the N bits of information by using a differential code map. The differential code map associates an X-wire code of the X target states to an N-bit word.

In further aspects, half of the X external wires are in a high state and half of the X external wires are in a low state for all combinations of the N bits of information transmitted over the X external wires. Thus exactly half of the X external wires are driven low.

In other aspects X is 6 and N is 4, so an average of 1.5 wires carry each bit of information. In other aspects the N bits of information include control signals transmitted from another chip to a chip containing the group-differential receiver.

In still other aspects a multi-wire differential interface has a plurality of X external wires and a transmitter chip coupled to the X external wires. The transmitter chip has an internal bus of N signals for transmission. An encoder receives the N signals and encodes the N signals as a (2i+2)-wire codeword. The (2i+2)-wire codeword has X bits for transmission over the X external wires, where half of the X bits are high and half of the X bits are low for all codewords.

Each line driver in a plurality of X line drivers receive one of the X bits of the (2i+2)-wire codeword from the encoder. Each line driver drives one of the X external wires high or low. Half of the X external wires are driven low by the line drivers and half of the X external wires are driven high by the line drivers.

A receiver chip is coupled to the X external wires and has a plurality of differential comparators for comparing each of the X external wires to a remaining X−1 other wires in the X external wires. Each differential comparator generates a compare output for a pair of wires. A plurality of X majority blocks each receives compare outputs from differential comparators having a target wire of the X external wires as a comparator input and one of a remaining X−1 other wires as another comparator input. Each majority block outputs a target state of the target wire as a logic state of a majority of the compare outputs received by the majority block.

A decoder receives X target states from the plurality of X majority blocks. It converts the X target states as a (2i+2)-wire codeword to recover the N signals transmitted. An internal bus has N signals received from the transmitter chip over the X external wires. Thus the differential comparators that compare pairs of the X external wires and the majority blocks extract states of the X external wires carrying the (2i+2)-wire codeword.

DETAILED DESCRIPTION

The present invention relates to an improvement in differential signaling. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that although differential sensing techniques are normally applied to a pair of 2 wires, the differential techniques can also be applied to larger groups of wires. Larger groups of 2i+2 wires, such as 4, 6, 8, 10 or more wires can be used. Differential sensing is performed among all wires in a group, rather than just among the two wires in a pair.

In traditional differential transmission, for each pair of wires, one wire is driven low and the other is driven high. Within the larger group of 2i+2 wires of the invention, an equal number of wires are driven high and low. However, there is no pairing of the wires in the group. Any of the wires can be driven high or low as long as the total number of wires driven high equals the total number of wires driven low in the group.

Differential codes have been developed by the inventor for use with the 2i+2 wires (i.e. 4-wire, 6-wire, 8-wire, 10-wire, etc. coding), where i is a positive integer. These differential codes have equal numbers of zeros and ones. Although not as efficient as single-wire transmission, which uses 1 wire per bit, the differential codes are more efficient that simple differential pairing, which requires 2 wires per bit. For example, 6 bits can be transmitted over 8 wires using the invention, or 1.3 wires per bit (8/6). This is a significant improvement over 2.0 wires per bit using differential pairs.

Figure 4:
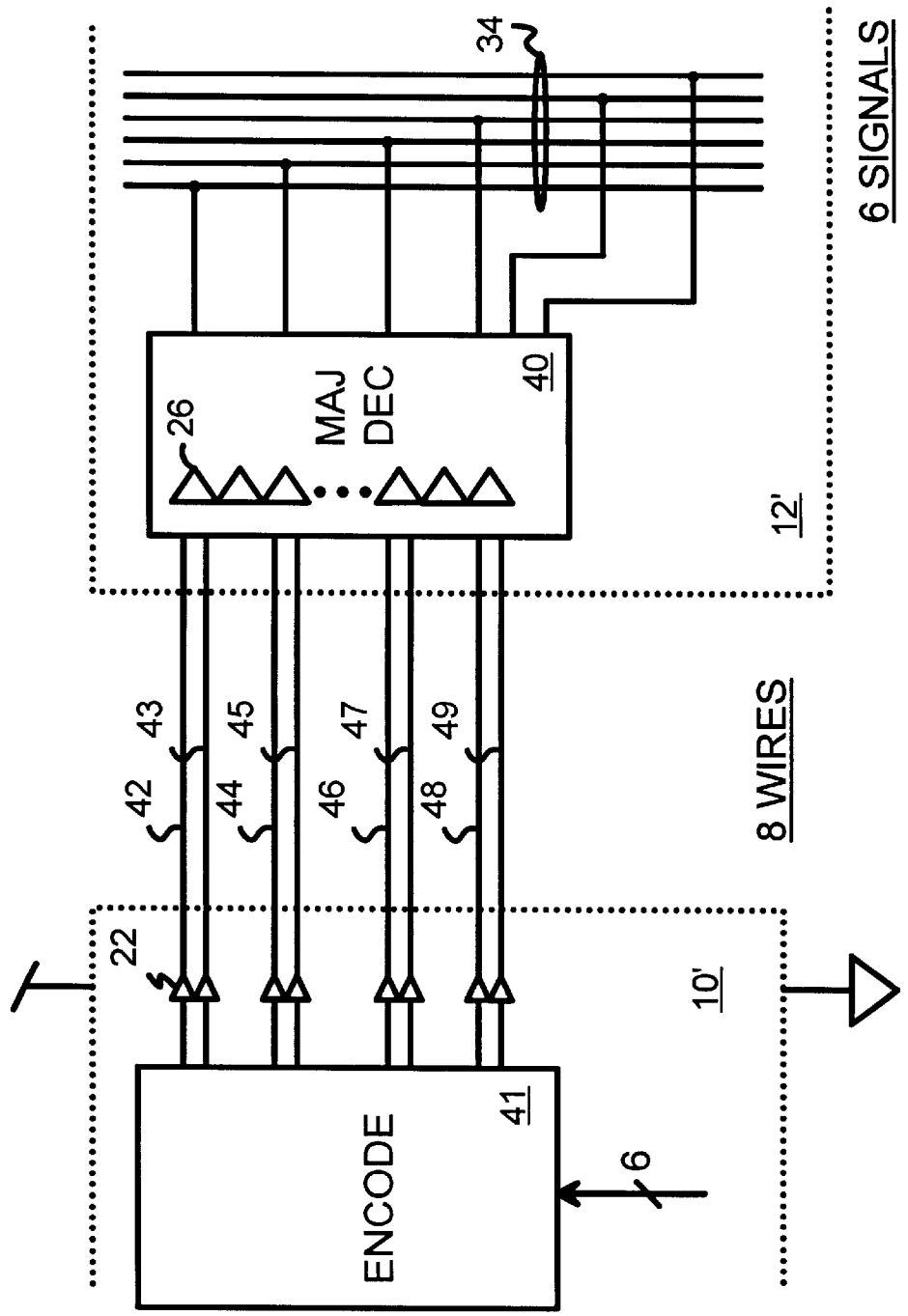
FIG. 4 illustrates group differential transmission between integrated circuits.

FIG. 4 illustrates group differential transmission between integrated circuits. A 6-bit internal bus, or 6 internal control signals, is transmitted from chip 10' to chip 12' over 8 wires 42–49 using group differential coding. There are 70 possible codes of 8 bits that have four ones and four zeros:

| | | | |
|---|---|---|---|
| 11110000 | 11101000 | 11011000 | 10111000 |
| 01110001 | 01101001 | 01011001 | 00111001 |
| 00110011 | 00101011 | 00011011 | 00111010 |
| 10101010 | 01010101 | 00001111 | etc. |

The $2^6$ or 64 binary combinations of the 6-bit internal bus are encoded with 64 of the 70 possible codes of the 8 wires. The mapping of 6-bit binary values to the 8-wire codes is arbitrary, but both chips 10', 12' must use the same mapping.

Encoder 41 converts the 6-bit binary values of the internal bus into the 8-wire codes with four 1's and 4 0's. The 8-wire code is transmitted by drivers 22 onto the external 8 wires 42–49 to chip 10'.

Note that pairs of wires such as 42, 43 can both be high or both low, as well as in opposite states. As an example, code 11001001 has wires 42, 43, 46, 49 high but wires 44, 45, 47, 48 low. The only restriction on the 8 wires 42–49 is that half of the 8 wires are high and half are low.

All External Wires Compared to All Other Wires

The states of the 8 wires 42–49 are detected by differential comparators 26 in chip 12'. Rather than use just one comparator for each pair of wires, additional comparators are used so that every one of the 8 wires 42–49 is compared with all of the other 8 wires 42–49. Thus wire 42 is compared to wire 43 in one differential comparator, and compared to wire 44 in another differential comparator, and to wire 45 in still another differential comparator. Four other differential comparators 26 compare wire 42 with wires 46, 47, 48, and 49. Thus a total of 7 differential comparators 26 compare wire 42 with the other wires 43–49. Other comparators compare all other pairs of wires 42–49.

The logical state of any wire can be sensed by comparison with all other wires. Since half of the wires are in one state and half in another state, the state of a wire can be determined by the majority of the comparison results. For example, when wire 42 is high, 3 other wires 43–49 must also be high, but 4 of the other wires 43–49 must be low. When wire 42 is high four of the seven comparisons are with wires having the opposite state of wire 42.

Majority Logic Determines Wire State

A voting or majority logic circuit is used to determine the state of wire 42. When the majority of the differential comparisons output a low, wire 42 must be high. When the majority of the differential comparisons output a high, wire 42 must be low.

When wire 42 is compared with another wire having the same logical state, the voltages may be identical. The output is not deterministic and can be high or low. However, when wire 42 is compared with the four wires that have the opposite logical state, the voltages differ and the outputs are deterministic, indicating either the state or opposite state of wire 42, depending on whether wire 42 was input to the inverting or non-inverting input of the differential comparators.

Majority decoder 40 in chip 12' receives the outputs from differential comparators 26 and determines the original state of each of the 8 wires 42–49 using 8 majority circuits. Then majority decoder 40 decodes the 8-wire code using the reverse mapping of encoder 41 in chip 10' to generate the original 6-bit binary value. The 6-bit binary value is driven out to internal bus 34 by majority decoder 40.

Figure 1A:
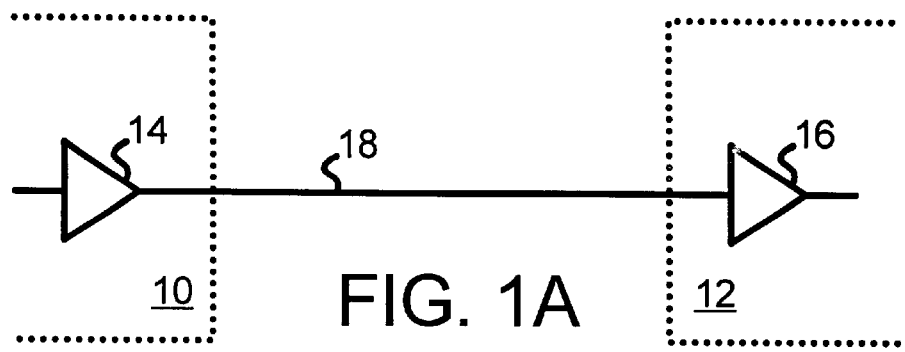
FIG. 1A highlights single-wire transmission.
Figure 1B:
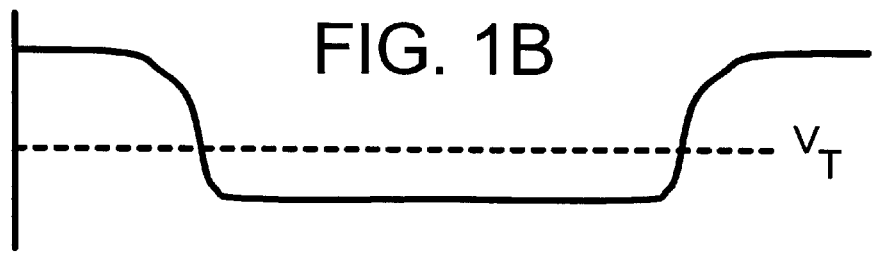
FIG. 1B shows that the signal on the single wire is compared with a logic threshold.
Figure 2A:
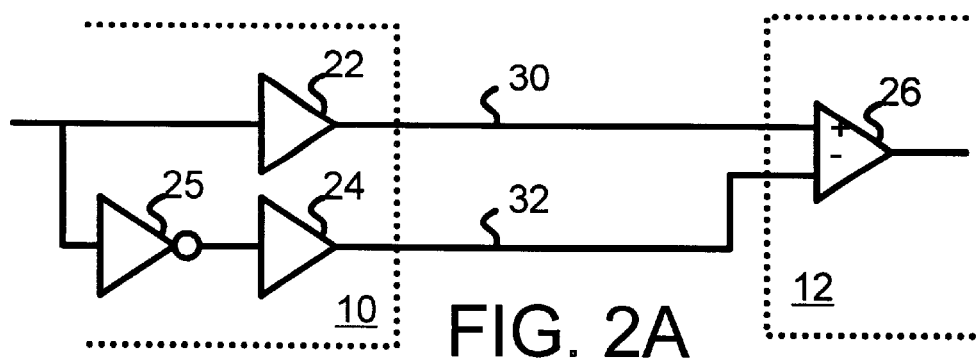
FIG. 2A shows a differential signal passed between two chips.
Figure 2B:
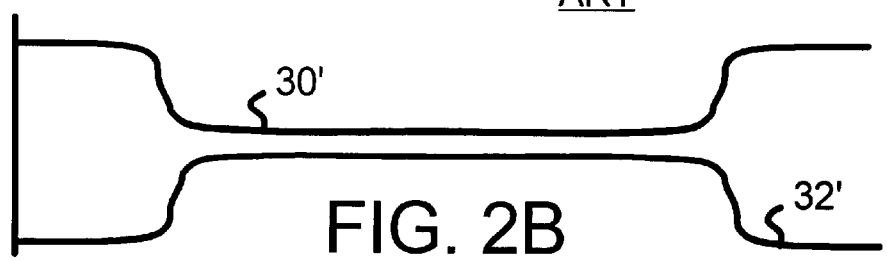
FIG. 2B shows waveforms of a differential pair of wires.
Figure 3:
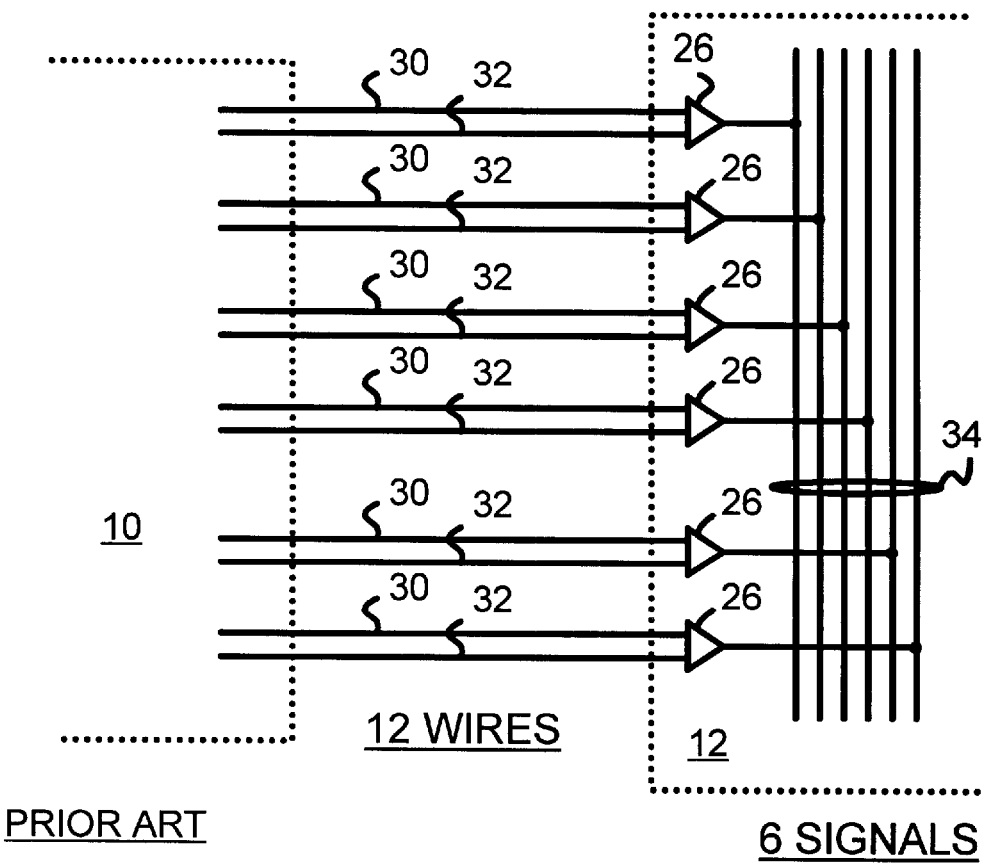
FIG. 3 illustrates a prior-art signaling technique using differential-pairs or wires.

Thus 6 internal signals are encoded into an 8-wire code and transmitted. The receiver uses differential comparators for all possible pairs of the 8 external wires and majority logic determines the logical state of each of the external 8 wires. Then the 8-wire codes are decoded to recover the logical states original 6 internal signals. Prior-art differential pairs such as shown in FIG. 3 require 6×2 or 12 external signals. The invention uses only 8 external signals, yet benefits from the common-mode noise rejection of differential signals, since differential rather than single-ended sensing is used by the receiver.

Common-Mode Noise Rejection

Since differential rather than single-ended sensing is used by the receiver, the external wires are not compared to an arbitrary threshold voltage. Comparison does not depend on ground or power-supply levels in the receiver chip or the transmitter chip, since only the difference in voltage of pairs of external signals is sensed. Noise sources should couple into all external wires equally so noise affects all external wires equally and is rejected by the differential comparators as common-mode signals.

Small voltage differences can be detected, so the voltage swings can be limited. Current steering output drivers can be used. Since half of the external wires of the invention are always driven high and half are always driven low, the output current remains constant. Current spikes from switching are minimal, reducing ground bounce in the transmitter chip 10'. Power can be reduced and speed increased by limiting voltage swings of the external wire interface.

Figure 5A:
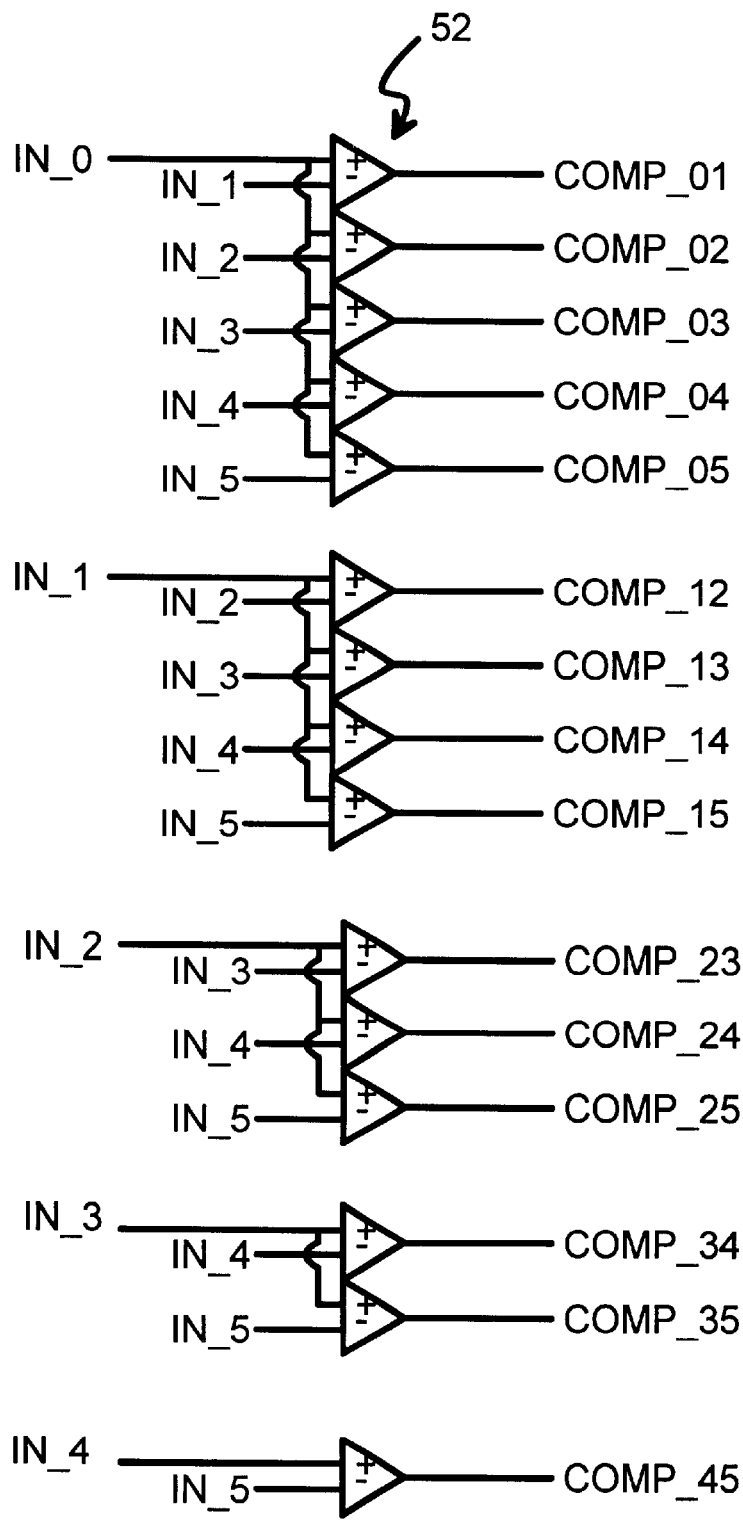
FIGS. 5A–C show in detail the differential comparators and majority decoder.
Figure 5B:
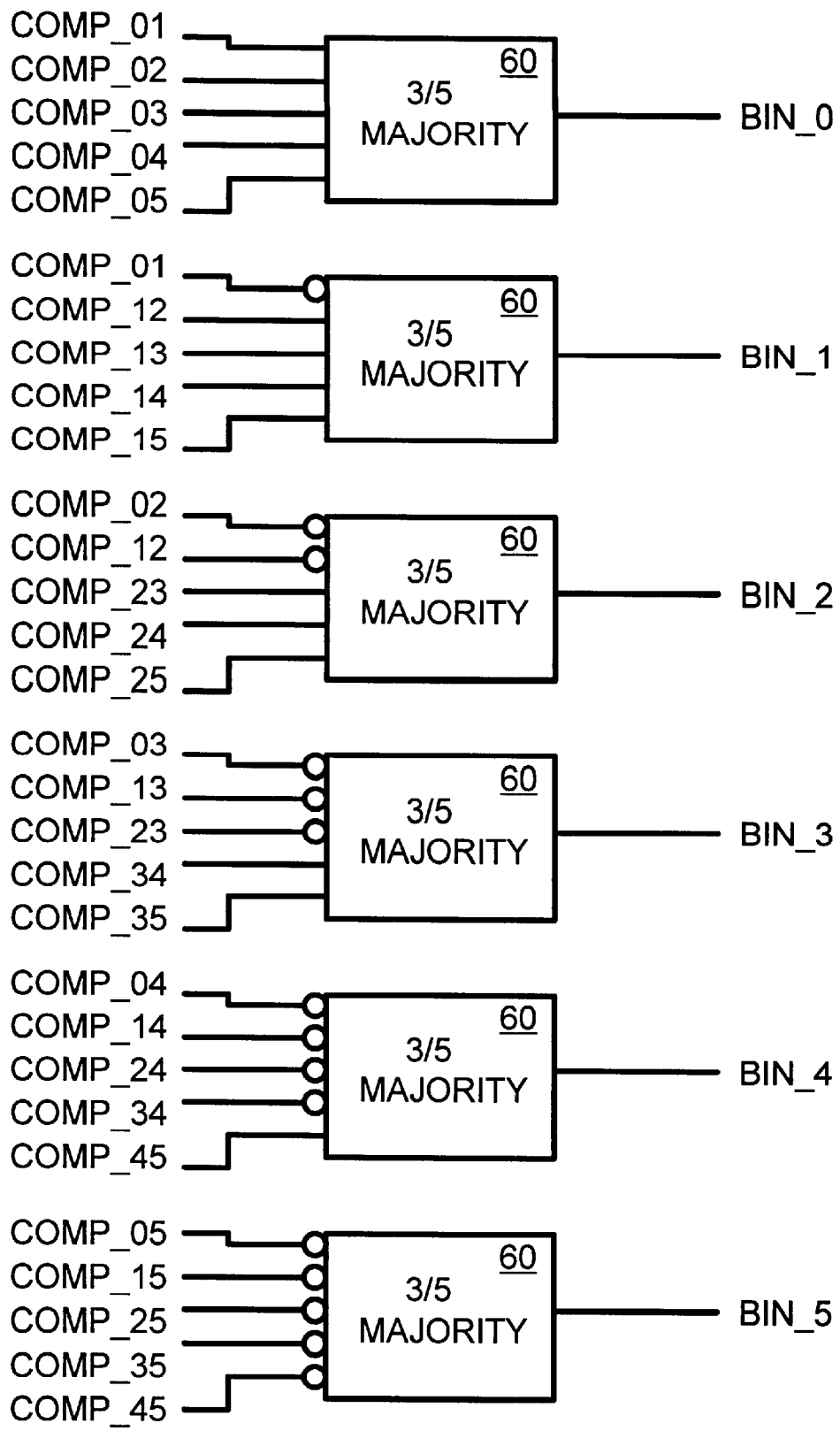
Figure 5C:
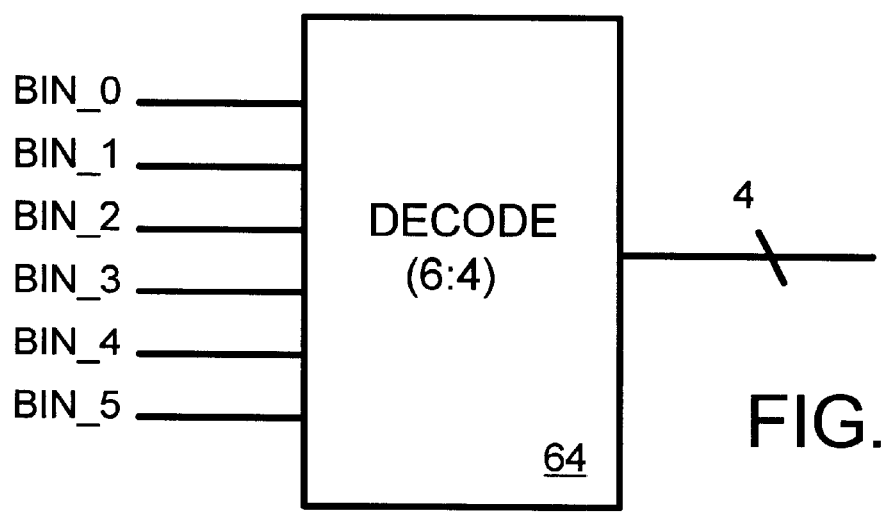

Majority Decoder-Receiver—FIGS. 5A–C

FIGS. 5A–C show in detail a differential compare and majority decoder circuit. A simplified embodiment for 6 external wires that encode a 4-bit internal bus is detailed.

In FIG. 5A, differential comparators 52 compare each of the 6 external-wires inputs IN__0 to IN__5 with all the other external-wire inputs. The first external-wire input, IN__0, is compared with inputs IN__1, IN__2, IN__3, IN__4, and IN__5 by five differential comparators 52. Five outputs are generated: COMP__01 is the comparison of IN__0 with IN__1, COMP__02 is the comparison of IN__0 with IN__2, COMP__03 is the comparison of IN__0 with IN__3, COMP__04 is the comparison of IN__0 with IN__4, and COMP__05 is the comparison of IN__0 with IN__5.

For the second input IN__1, four differential comparators 52 compare the wire to the remaining four inputs IN__2 to IN__5. The comparison with the first input IN__0 was already made. Compare outputs COMP__12 to COMP__15 are output.

The third input IN__2 is compared with the remaining three inputs IN__3, IN__4, IN__5, generating three outputs COMP__23, COMP__24, and COMP__25. The fourth input IN__3 is compared to IN__4 and IN__5, while the fifth input IN__4 is compared to the last input IN__5 by the last comparator, producing COMP__45.

At total of 15 differential comparators 52 are needed to compare all possible pairs of the 6 external-wire inputs. Each pair needs to be compared only once. The polarity of the compare output COMP__xx depends on which input is connected to the inverting and non-inverting inputs of the differential comparator.

For the first 5 comparators, the IN__0 signal is applied to the non-inverting (+) input of each differential comparator, while the other IN__1 to IN__5 signals are applied to the inverting input (−). When IN__0 is high and the other input is low, the differential comparator outputs a high. When IN__0 is low and the other input is high, the differential comparator outputs a low. When both inputs are high or both low, the output can be either high or low, depending on the exact voltages.

The compare signal name (COMP_14 for example) indicates that the first (0) input is applied to the non-inverting (+) input while the second (4) input is applied to the inverting (−) input of the comparator. The number of comparators used is X(X−1)/2, where X is the number of external wires.

Majority Logic Evaluates State of External Wires—FIG. 5B

In FIG. 5B, the comparisons from all 15 possible pairs of the 6 external wires are examined by majority logic to determine the logical state of each of the 6 external wires. The differential codes require that half of the external wires are high and half are low, so 3 wires must be high and 3 wires low. The majority logic determines which 3 wires were high and which 3 were low.

Since exactly half of the 6 external wires are in a given state, only 2 wires can have the same state as a wire being compared. The other 3 wires must have the opposite state. For example, if wire IN_0 is high, then only 2 of the remaining 5 wires are high. Three of the remaining 5 wires are low. Since 3 is the majority of 5, the majority of the signals are always in the opposite state of the wire being compared.

One majority logic 60 block is used for each of the six wires to determine the logical state of the wire. Majority logic 60 receives 5 compare inputs from all differential comparators that have the wire being examined as one of the inputs. For example, the first majority logic 60 block determines the logical state of the first external wire IN_0. The logical state determined is output by majority logic 60 as BIN_0, the binary value of wire 0. The five inputs to the first majority logic 60 block are COMP_01, COMP_02, COMP_03, COMP_04, and COMP_05. These are the results from differential comparisons of input IN_0 with the other five wire inputs IN_2 to IN_5.

Three of the other wires IN_1 to IN_5 are in a logical state opposite to the state of wire IN_0. It is not necessary to know which of the wires are in each state at this point. Whatever logical value that three of the five inputs to majority logic 60 have determines the logical state of IN_0. The logical value of the majority of the compare inputs is inverted to produce the logical state of the wire IN_0. Thus when 3 of the 5 comparison inputs are high, wire IN_0 must be low. When 3 of the five comparison inputs are low, wire IN_0 must be high. The majority value is inverted and output as the wire's binary state, BIN_0.

Each of the other 5 wires are examined by five other blocks of majority logic 60 in a similar way. The binary values of each of these five other wires are output by majority logic 60 as BIN_1, BIN_2, BIN_3, BIN_4, and BIN_5.

Since the wire being evaluated may not have been applied to the non-inverting (+) input of the differential comparator, some of the compare inputs need to be inverted before being evaluated by majority logic 60. For example, COMP_01 had wire IN_1 applied to the inverting input (−) of the differential comparator. COMP_01 is low rather than high when IN_1 is higher. COMP_01 is thus inverted before being input to majority logic 60 that evaluates wire IN_1 and outputs BIN_1. For the last wire IN_5, all of the compare inputs are inverted before being input to majority logic 60, since IN_5 was applied to the inverting inputs of all differential comparators in FIG. 5A.

The majority logic that receives the compare outputs allows for some indeterminate signals, as long as a majority of the signals is deterministic. When two wires in the same logical state are compared, the output of the differential comparator is indeterminate, being either high or low depending on the exact voltages. It is the wires in the opposite state that form the majority that is detected by majority logic 60. Having wires in the same state producing indeterminate results is not a problem, since the majority logic produces the correct output even when one or two extra compare results are incorrectly in the same state as the majority.

FIG. 5C shows the decoder that decodes the binary values of the 6 external wires to recover the 4 binary bits that were encoded with a 6-wire code and transmitted. The outputs from the majority logic blocks of FIG. 5B, which are the binary states of the 6 external wires, are input to decoder 64. Decoder 64 takes the six inputs and performs a decode or a table lookup to determine what 4-bit value was mapped to the states of the 6 wires that was evaluated. For example, when the 6 external wires are 100101, the 6-wire code could be mapped to the binary value 5 (0101). The four-bit binary value is output by decoder 64 to an internal bus.

The 6 bits transmitted were encoded by the transmitter chip as one of the 20 possible codes of 8 bits that have 4 ones and 4 zeros. The 20 possible codes are:

| | | | |
|---|---|---|---|
| 111000 | 110100 | 110010 | 110001 |
| 101100 | 101010 | 101001 | 100110 |
| 100101 | 100011 | 011100 | 011010 |
| 011001 | 010110 | 010101 | 010011 |
| 001110 | 001101 | 001011 | 000111 |

These codes could be mapped to 4-bit binary value as shown below, where the 4-bit value is shown in parenthesis:

| | | | |
|---|---|---|---|
| (0) 111000 | (1) 110100 | (2) 110010 | (3) 110001 |
| (4) 101100 | (5) 101010 | (6) 101001 | (7) 100110 |
| (8) 100101 | (9) 100011 | (10) 011100 | (11) 011010 |
| (12) 011001 | (13) 010110 | (14) 010101 | (15) 010011 |

The last row of differential code is not used:

| | | | |
|---|---|---|---|
| 001110 | 001101 | 001011 | 000111 |

These unused codes could be reserved for other chip-to-chip signaling such as resets and interrupts. Many other mappings of the 6-wire code to the 4-bit binary values are possible.

Figure 6:
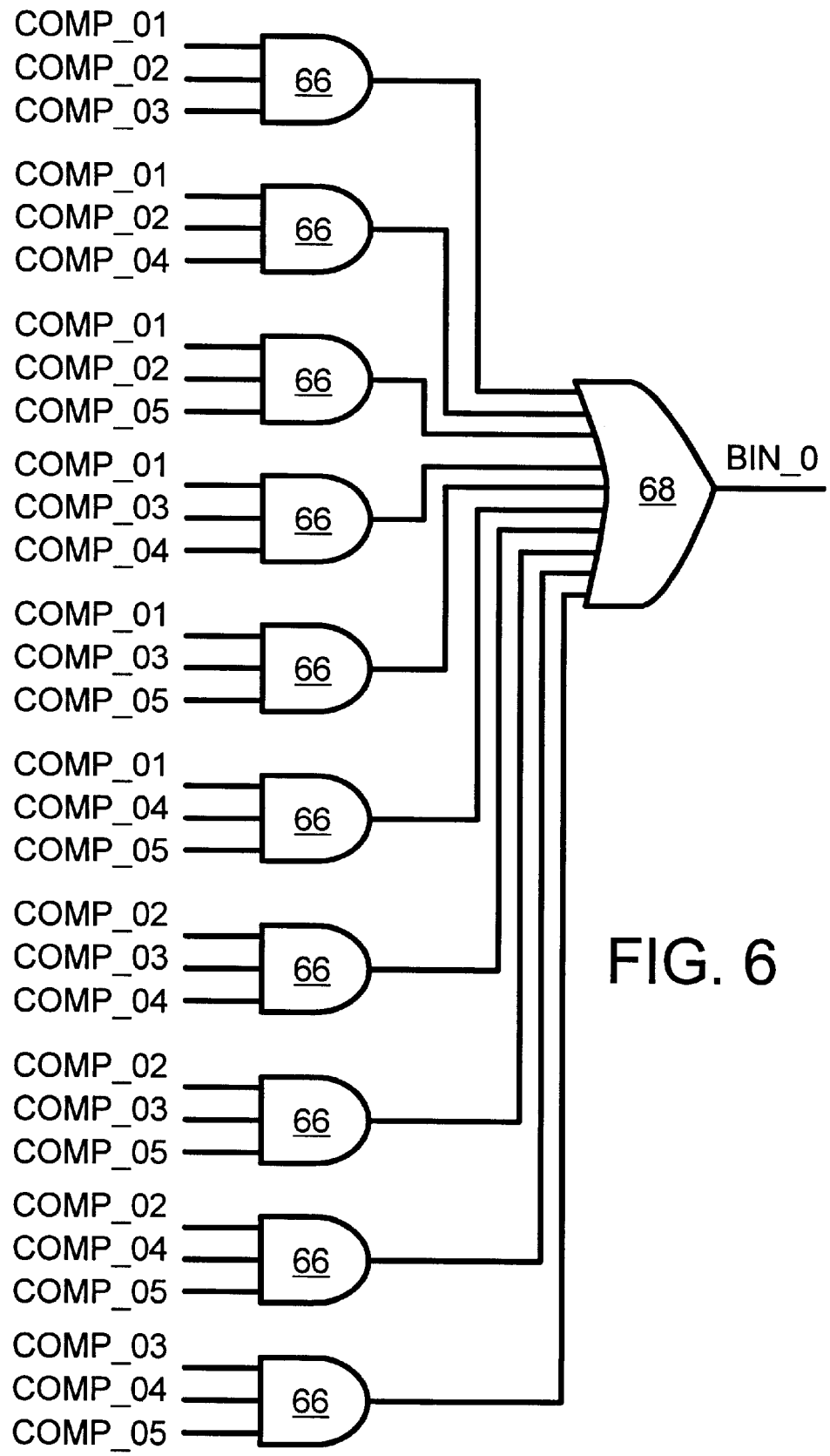
FIG. 6 is a schematic of a ⅗ majority logic circuit.

Example of Majority Logic—FIG. 6

FIG. 6 is a schematic of a ⅗-majority logic circuit. The output BIN_0 is the binary state of input IN_0 as evaluated by the majority logic 60. AND gates 66 each receive 3 of the 5 compare inputs, after any necessary inversions shown in FIG. 5B. The upper AND gate 66 outputs a high when COMP_01, COMP_02, and COMP_03 are all high. This occurs when inputs IN_1, IN_2, and IN_3 (applied to the −input of the comparators) are low and input IN_0 is high. Since 3 inputs are the majority of 5, a majority is found to be low. IN_0 must be in the opposite state (high). Thus the high from the upper AND gate 66 is propagated through OR gate 68 to the BIN_0 output.

The other AND gates 66 search for any three compare inputs that are all in the high state, for all other combinations of three of the five inputs. A total of 10 possible combinations exist, so ten AND gates 66 are ORed together by OR gate 68. Other majority logic blocks for evaluating the other wires are constructed in a similar manner.

Figure 7:
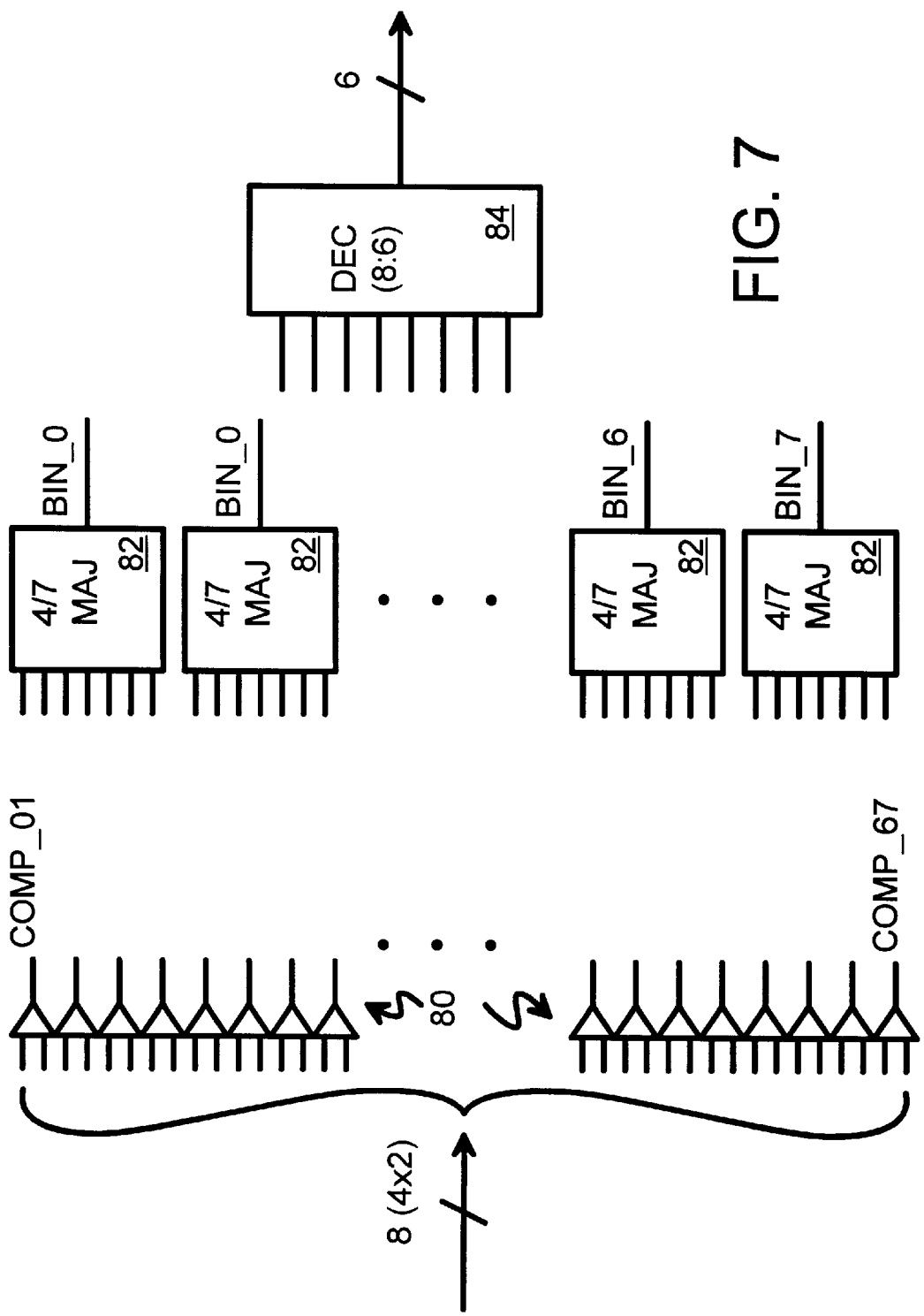
FIG. 7 illustrates comparing 8 external wires using 4/7 majority logic to extract a 6-bit binary value.

8-Wire Coding—FIG. 7

While FIGS. 5A–C and 6 have shown a 6-external-wire embodiment, other embodiments are contemplated. For example, 8 external wires can encode a 6-bit binary value. Embodiments with 10, 12, 14, 16, and more external wires are contemplated. The number of external wires is always an even number, so that half of the external wires are driven high and half driven low at any time.

FIG. 7 illustrates comparing 8 external wires using 4/7 majority logic to extract a 6-bit binary value. The 8 external wires are compared with differential comparators 80. Since each differential comparator compares only two of the eight wires, a total of 7+6+5+4+3+2+1 or 28 comparators are needed to compare all 28 pairings of the 8 external wires. The 28 compare outputs are COMP_01 to COMP_67, which compares the last ($8^{th}$) and the next-to last ($7^{th}$) wires.

One 4/7 majority block 82 is needed to evaluate each of the 8 wires. Thus 8 majority blocks 82 are used. Each 4/7 majority block 82 receives the 7 compare inputs from comparators having the evaluated wire as one of the two inputs. The majority of the 7 compare inputs is evaluated by finding 4 compare inputs with the same logical value. This value is output as the binary value of the wire being evaluated, BIN_0 to BIN_7.

Decoder 84 receives the 8 binary values determined by majority blocks 82. The 8-wire codes are decoded or a table lookup performed to find the 6-bit binary value that corresponds to the 8-wire code. The 6-bit binary value is output. Thus 6 binary bits are carried over 8 wires using the differential code.

ADVANTAGES OF THE INVENTION

A differential signaling technique uses fewer wires. The number of external wires needed when transmitting digital signals is reduced. Differential-comparator receivers are used that are insensitive to common-mode noise. Differential sensing provides noise immunity, while differential transmission can limit voltage swings and noise generation. A compressed differential-signaling technique uses fewer wires. Fewer than 2N external wires are used while still obtaining the benefit of differential sensing.

While prior-art differential signaling techniques are more noise tolerant than single-wire signaling, costs are higher. The number of external wires is doubled for standard differential-pair signaling. Bonding pads for external wires occupy a large area on many integrated circuit chips, increasing cost. Leads on the IC packages are also limited.

Increasing the number of external wires connected to a chip by using differential pairs is expensive since larger packages may be required. The invention reduces the number of external wires needed while still using differential sensing. For example, 6 bits can be transmitted over 8 wires using the invention, or 1.3 wires per bit (8/6). Four bits can be carried over 6 wires, a ratio of 1.5 wires per bit. This is a significant improvement over 2.0 wires per bit using differential pairs.

The transmitter chip can have a different ground potential than receiver chip, since the ground shift affects all wires equally. Very small voltage differences between the wires can be detected and amplified using current technology. Differential signaling is especially useful when the length of the transmission line attenuates the signal, because the differential receiver is capable of detecting small voltages.

The voltage and current of a differential signal is smaller than the voltage and current of a single wire signal. A transmission line is terminated by a matched impedance resistor that removes the signal's reflection. The resistor value is chosen to match with the impedance of the transmission line. The terminating resistor creates the voltage that the receiver needs to recover the signal. The signals are transmitted using current drivers. The differential signals allow for smaller currents, compared with the currents needed by the single wire signals, because the receiver is capable of recovering signals from the small voltage. This reduces power consumption and limits noise generated by the two wires. Radiation-causing electromagnetic interference (EMI) from differential signals is small compared with the amount of EMI from single-wire signals. The radiation from a positive traveling wave is complementary to the radiation from a negative traveling wave. The net result of the complimentary radiation is zero. Small voltage swings will also help to reduce the radiation that occurs when the traveling waves are not exactly complementary.

ALTERNATE EMBODIMENTS

Several other embodiments are contemplated by the inventor. For example many other logic and circuit implementations are possible. Signals can be inverted or complemented. Signals can be recovered using circuits that do not use majority decoders. While the invention has been described as transmitting signals over external wires between integrated circuit chips, the technique could be used for internal busses within noisy chips, or on a noisy hybrid module. Larger numbers of external wires in the group can be used.

Dynamic memory devices such as DRAMs can benefit from the Multi-bit Differential Coding. The array of storage capacitors of the dynamic memory core can be reduced. The storage capacitors can be reduced by 25 percent when the 6-wire code is used and can be reduced by 33 percent when the 8-wire code is used.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A group-differential receiver comprising:

a plurality of inputs from X external wires, the X external wires for transmitting N bits of information, wherein X is less than 2N but greater than N;

a plurality of differential comparators for comparing each of the X external wires to a remaining X–1 other wires in the X external wires, each differential comparator generating a compare output for a pair of wires;

a plurality of X majority blocks, each majority block receiving X–1 compare outputs from a group of X–1 differential comparators, each differential comparator in the group having a target wire of the X external wires as a comparator input and one of a remaining X–1 other wires as another comparator input;

each majority block outputting a target state of the target wire as a logic state of a majority of the X–1 compare outputs received by the majority block; and a decoder, receiving X target states from the plurality of X majority blocks, for converting the X target states to the N bits of information, whereby the N bits of information are extracted by differential-comparison and majority-detection of the X external wires.

2. The group-differential receiver of claim 1 further comprising:
an inverter, coupled to the compare output from a differential comparator, for inverting the compare output input to a majority block when the target wire is applied to an inverting input of the differential comparator,
whereby compare outputs are inverted when the target wire is applied to the inverting input of the differential comparator.

3. The group-differential receiver of claim 1 wherein the decoder converts the X target states to the N bits of information by using a differential code map, the differential code map associating an X-wire code of the X target states to an N-bit word.

4. The group-differential receiver of claim 3 wherein half of the X external wires are in a high state and half of the X external wires are in a low state for all combinations of the N bits of information transmitted over the X external wires,
whereby exactly half of the X external wires are driven low.

5. The group-differential receiver of claim 4 wherein X is 6 and N is 4, whereby an average of 1.5 wires carry each bit of information.

6. The group-differential receiver of claim 1 wherein the N bits of information include control signals transmitted from another chip to a chip containing the group-differential receiver.

7. A multi-wire differential interface comprising:
a plurality of X external wires;
a transmitter chip, coupled to the X external wires, comprising:
an internal bus of N signals for transmission;
an encoder, receiving the N signals, for encoding the N signals as a (2i +2)-wire codeword, the (2i+2)-wire codeword being X bits for transmission over the X external wires, wherein half of the X bits are high and half of the X bits are low for all codewords;
a plurality of X line drivers, each line driver receiving one of the X bits of the (2i +2)-wire codeword from the encoder, each line driver driving one of the X external wires high or low;
wherein half of the X external wires are driven low by the line drivers and half of the X external wires are driven high by the line drivers;
a receiver chip, coupled to the X external wires, comprising:
a plurality of differential comparators for comparing each of the X external wires to a remaining X−1 other wires in the X external wires, each differential comparator generating a compare output for a pair of wires;
a plurality of X majority blocks, each majority block receiving compare outputs from differential comparators having a target wire of the X external wires as a comparator input and one of a remaining X−1 other wires as another comparator input;
each majority block outputting a target state of the target wire as a logic state of a majority of the compare outputs received by the majority block;
a decoder, receiving X target states from the plurality of X majority blocks, for converting the X target states as a (2i +2)-wire codeword to recover the N signals transmitted, and
an internal bus of N signals received from the transmitter chip over the X external wires,
whereby the differential comparators that compare pairs of the X external wires and the majority blocks extract states of the X external wires carrying the (2i +2)-wire codeword.

8. The multi-wire differential interface of claim 7 wherein each majority block receives X−1 compare outputs from a group of X−1 differential comparators, each differential comparator in the group having a target wire of the X external wires as a comparator input and one of a remaining X−1 other wires as another comparator input;
each majority block outputting a target state of the target wire as a logic state of a majority of the X−1 compare outputs received by the majority block,
whereby a majority of the X−1 compare inputs are detected by the majority block.

9. The multi-wire differential interface of claim 8 where in when a differential comparator compares a target wire to one of the remaining X−1 other wires that are in a same logical state, the compare output is indeterminate, being high or low,
wherein indeterminate compare outputs do not affect the target state output by the majority block since the target state is determined by a majority of the remaining X−1 other wires that are in an opposite logical state to the target wire,
whereby indeterminate compare outputs are acceptable.

10. The multi-wire differential interface of claim 8 wherein the line drivers have a limited voltage swing.

11. The multi-wire differential interface of claim 8 wherein X is an even number greater than 2.

12. The multi-wire differential interface of claim 11 wherein X is 8 and N is 6, whereby an average of 1.3 external wires carries each bit of information transmitted.

13. The multi-wire differential interface of claim 8 wherein a constant line-driver current is required by the transmitter chip since half of the X external wires are always driven low and half driven high.

14. The multi-wire differential interface of claim 8 wherein the internal bus of N signals includes control signals and data signals.

15. A method for transmitting N bits of information over a group-differential interface of X external signals, wherein X is between N and 2N, the method comprising:
encoding N bits of information into an X-bit codeword, the X-bit codeword having X/2 signals in a high state and X/2 signals in a low state;
driving X external signals with the X-bit codeword by driving X/2 external signals lower in voltage and X/2 external signals higher in voltage;
receiving the X external signals in a receiver chip;
inputting pairs of the X external signals to a plurality of differential comparators, each differential comparator outputting a compare signal indicating which of the pair of external signals is higher in voltage;
wherein each of the X external signals is compared by X−1 differential comparators to all X−1 other external signals of the X external signals, the compare signals output by the X−1 differential comparators being a compare group;
inputting all X−1 compare signals from a compare group to a majority circuit;
inputting all X−1 compare signals from X−1 other compare groups to X−1 other majority circuits;
determining a majority logical state of the X−1 compare signals input to each of X majority circuits and outputting X detected state of the X external signals;
arranging the X detected states of the X external signals from the majority circuits into an X-bit received codeword; and decoding the X-bit received codeword into an N-bit binary word, the N bit binary word being the N bits of information transmitted over the group-differential interface of the X external signals, whereby differential comparators detect states of the X external signals encoded with the N bits of information, where X is greater than N but less than 2N.

16. The method of claim 15 wherein encoding N bits of information into an X-bit codeword and decoding the X-bit received codeword each comprise a table lookup, the table having $2^N$ entries, each entry associating a binary N-bit word with an X-bit codeword, wherein each X-bit codeword has exactly X/2 bits in a high state and X/2 bits in a low state.

17. The method of claim 15 wherein X is about 1.5 times N.

18. The method of claim 15 wherein a number of 2-input comparators in the plurality of differential comparators is equal to X(X−1)/2.

19. The method of claim 15 wherein driving X external signals with the X-bit codeword by driving X/2 external signals lower in voltage and X/2 external signals higher in voltage comprises steering a constant current to a different group of X/2 external signals in the X external signals as different codewords are transmitted, whereby transmitter current is constant.

20. The method of claim 15 further comprising:

rejecting common-mode noise coupled into the X external signals when comparing the pairs of the X external signals with the plurality of differential comparators, each differential comparator comparing a voltage of one of the X external signals to a voltage of another of the X external signals, whereby common-mode noise is rejected by the differential comparators.

* * * * *